United States Patent
Nomura et al.

(10) Patent No.: US 6,495,050 B1
(45) Date of Patent: Dec. 17, 2002

(54) METHOD FOR TREATING MANGANESE CONTAINING WATER

(75) Inventors: Junichi Nomura, Kanagawa (JP); Shinichiro Egawa, Kanagawa (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/623,509

(22) Filed: Dec. 18, 2000

(30) Foreign Application Priority Data

Mar. 30, 1998 (JP) .............................. 10-09986

(51) Int. Cl.[7] .................................. C02F 1/64
(52) U.S. Cl. ................ 210/712; 210/715; 210/724; 210/726; 210/912; 423/50; 423/419.1; 423/420.2
(58) Field of Search .................. 210/714, 712, 210/715, 724, 912–914, 726; 423/50, 419.1, 420.2

(56) References Cited

U.S. PATENT DOCUMENTS

| | | | | |
|---|---|---|---|---|
| 4,861,493 A | * | 8/1989 | Jansen | 210/715 |
| 5,106,509 A | * | 4/1992 | Jansen | 210/15 |
| 6,096,206 A | * | 8/2000 | Huang | 210/202 |

FOREIGN PATENT DOCUMENTS

| | | | |
|---|---|---|---|
| JP | 76030386 B | * | 8/1976 |
| JP | 61-93892 A | | 5/1986 |
| JP | 09239361 A | * | 3/1996 |
| JP | 10-137772 | | 5/1998 |

OTHER PUBLICATIONS

Mitsuyoshi Utosawa, "Mangansa o mochiita mangan jokyo ni kansuru jikken (3)", Doboku Gakkai Hokkaido Shibu Rombun Houkokushuu, vol. 47, 1990, pp. 509 to 514 p. 509, lines 7 to 11; p. 512, line 2 to p. 513, line 5; Figs. 4 to 8.

Mitsuyoshi Utosawa, "Mangansa o monchitta Mangan jokyo ni kansuru jikken–ka mangan san kalium saiseihou—", Doboku Gakkai Hokkaido Shibu Rombun Houkokushuu, vol. 45, 1988, pp. 397 to 400 p. 397, lines 8 to 12.

* cited by examiner

Primary Examiner—Peter A. Hruskoci
(74) Attorney, Agent, or Firm—Oblon, Spivak, McClelland, Maier & Neustadt, P.C.

(57) ABSTRACT

A treating method and apparatus for treating a manganese containing water by crystalizing and removing a soluble manganese in a water to be treated containing carbonic acid ions by passing the water to be treated as an upward flow through a fluidized bed reaction tower having no support bed and containing manganese sand as a fluidized bed material and by adjusting a pH value of the water to be treated in said fluidized bed. A suspended manganese is also removed together with said soluble manganese in the water to be treated by forming a suspended solid in the water to be treated into a layer on said manganese sand fluidized bed by removing said layer of suspended solid. Further, a desired quantity of the treated water is introduced into the water to be treated for circulatory use.

4 Claims, 3 Drawing Sheets

METHOD FOR TREATING MANGANESE CONTAINING WATER

FIELD OF THE INVENTION

The present invention relates to a treatment of the water containing manganese, in particular, to a method and an apparatus for treating the water containing high concentration of soluble manganese including an irrigation water, an industrial waste water, a sludge treatment waste water for water supply or the like.

BACKGROUND OF THE INVENTION

Figure 5:
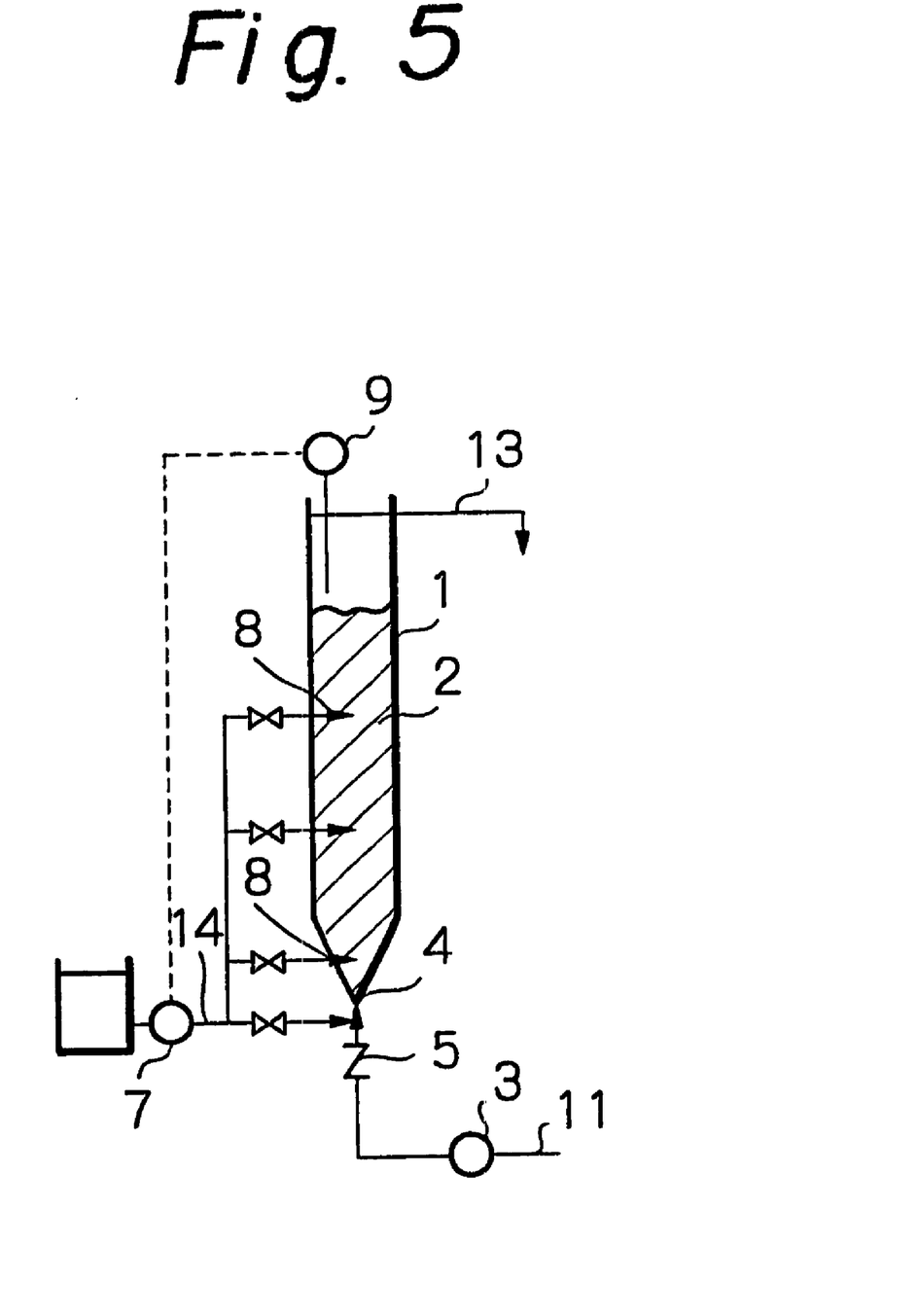
FIG. 5 shows a schematic configuration of a conventional fluidized bed type manganese removal apparatus.

As for a manganese removal method by a fluidized bed, a technology disclosed by JP-A-10-137772 (Japanese Patent Laid-open Publication) is well known and a configuration thereof is shown in FIG. 5.

In the manganese removal method having a configuration shown in FIG. 5, the soluble manganese in the water to be treated is deposited and removed as manganese carbonate by applying a water 11 containing carbonic acid ions or including carbonic acid ions added thereto as an upward flow to a fluidized bed reaction tower 1 with no support bed containing manganese sand therein as a fluidized bed material 2, and by injecting an alkaline material into a vicinity of an inlet port 4 for the water to be treated of the fluidized bed reaction tower or into the fluidized bed so as to adjust a pH value of the water to be treated in the fluidized bed into 8 to 10.

The manganese removal method by the known fluidized bed will be now described in detail.

In a neutral or approximately neutral water, manganese exists in a form of $Mn(HCO_3)$ or $MnSO_4$ when it is divalent, and also in other form of $MnO_2 \cdot mH_2O$ when it is tetravalent. In this case, what is deposited and removed is the divalent manganese which takes a form of ion.

The divalent manganese reacts with carbonic acid ion to produce manganese carbonate as shown in a reaction formula (1).

$$Mn^{2+}+HCO_3^-+OH^- \rightarrow MnCO_3\downarrow +H_2O \qquad (1)$$

Manganese carbonate in the water to be treated gradually lowers a solubility thereof as a pH rises and moves into a metastable state, and then is crystallized. At that time, when the manganese carbonate in its metastable state comes in contact with the bed material for deposition, manganese carbonate is deposited on a surface of the bed material. Under this condition, the pH control is important because the deposition does not occur when the pH is low, and more manganese hydroxide rather than manganese carbonate is deposited when the pH is too high.

The conventional method, however, has the problems that, when the water to be treated includes high concentration of manganese, a metastable state period of the manganese becomes shorter and more amount of manganese hydroxide is likely to be deposited, and that, especially in the large treating apparatus, it is difficult to effectively inject arbitrary quantity of alkaline materials into plural portions of the fluidized bed. Further, since manganese existing in the water as a suspended solid has no relation with the above reaction, the suspended manganese in the water cannot be removed by the conventional manganese removal method. Furthermore, the above method has problems that, when a pH value of the water to be treated varies over wide range, a control thereof is difficult, and that, when the water to be treated includes high concentration of manganese, the metastable state of the manganese becomes shorter and more amount of manganese hydroxide is likely to be deposited.

PROBLEMS THE INVENTION IS TO SOLVE

The present invention is achieved in the light of the problems in the prior art described above, and a first object thereof is to provide a method and an apparatus for treating manganese containing water, in which the deposition of manganese hydroxide can be suppressed even if the concentration of manganese is high, and the alkaline material can be injected effectively. Further, a second object of the present invention is to provide a method and an apparatus for treating manganese containing water, in which both of the soluble manganese and the suspended manganese in the water can be removed.

Furthermore, a third object of the present invention is to provide a method and an apparatus for treating manganese containing water, in which the pH variation in the water to be treated can be easily coped with and the generation of manganese hydroxide can be suppressed even if the manganese concentration rises.

MEANS FOR SOLVING THE PROBLEMS

In order to accomplish the first object, the present invention provides a treating method of a manganese containing water for crystalizing and removing a soluble manganese in the water by applying the water to be treated containing carbonic acid ions as an upward flow to a fluidized bed reaction tower with no support bed containing manganese sand therein as a fluidized bed material, and by adjusting a pH value of the water to be treated in the fluidized bed, said method characterized in that a plurality of said fluidized bed reaction towers is provided and each of them is connected in series so that the water to be treated flows through them to make a multistage treatment.

Further, the present invention provides a treating apparatus of a manganese containing water, for crystalizing and removing a soluble manganese, comprising a fluidized bed reaction tower with no support bed containing manganese sand therein as a fluidized bed material, an inlet port provided on a bottom portion of said reaction tower for introducing a water to be treated containing carbonic acid ions, an outlet port provided on an upper portion of said reaction tower for discharging the treated water, and an injection port for injecting alkaline material for adjusting a pH value of the water to be treated in the fluidized bed, said apparatus characterized in that a plurality of said fluidized bed reaction towers is provided, and each of them is connected in series and is equipped with the injection port of alkaline material on the bottom portion of the reaction tower near to the inlet port of the water to be treated.

In the method and apparatus described above, it is preferable that the pH value of the water to be treated in the fluidized bed is controlled such that the pH value increases as a stage of the reaction tower proceeds from a former stage to a latter stage among the plurality of reaction towers while keeping a range thereof within 8 to 10, and it is also preferable that a pH control device is provided for controlling the pH value as described above.

In order to accomplish the second object, the present invention provides a treating method of a manganese containing water for crystalizing and removing a soluble manganese in the water by applying the water to be treated containing carbonic acid ions as an upward flow to a fluidized bed reaction tower with no support bed containing manganese sand therein as a fluidized bed material, and by adjusting a pH value of the water to be treated in the fluidized bed, said method characterized in that a suspended manganese in the water to be treated is removed along with the soluble manganese therein by forming, on a manganese sand fluidized bed in said fluidized bed reaction tower, a layer of suspended solid in the water to be treated which has passed through said manganese sand fluidized bed and by removing said layer of suspended solid.

Further, the present invention provides a treating apparatus of a manganese containing water for crystalizing and removing soluble manganese, comprising a fluidized bed reaction tower with no support bed containing manganese sand therein as a fluidized bed material, an inlet port provided on a bottom portion of said reaction tower for introducing a water to be treated containing carbonic acid ions, an outlet port provided on an upper portion of said reaction tower for discharging the treated water, and an injection port for injecting alkaline material for adjusting a pH value of the water to be treated in the fluidized bed, said apparatus characterized in that a suspended solid in the water to be treated is formed into a layer on a manganese sand fluidized bed in said fluidized bed reaction tower, and an ejector pipe is further provided in said layer of suspended solid for ejecting said suspended solid.

In the method and apparatus described above, it is preferable that the pH value of the water to be treated is controlled to be within a range of 8 to 10 by injecting the alkaline material to the bottom portion of the reaction tower near to the inlet port of the water to be treated.

As for the fluidized bed reaction tower, a horizontal cross section thereof in a portion where the suspended solid layer is formed on the manganese sand fluidized bed shall be larger than, preferably 1.4 times or more as large as that in another portion for the manganese sand fluidized bed.

In order to accomplish the third object, the present invention provides a treating method of a manganese containing water for crystalizing and removing a soluble manganese in the water by applying the water to be treated containing carbonic acid ions as an upward flow from a bottom portion of a reaction vessel to said fluidized bed reaction vessel with no support bed containing manganese sand therein as a fluidized bed material, and by injecting alkaline material into the bottom portion of the reaction vessel near to an inlet port of the water to be treated and/or into the fluidized bed to adjust a pH value of the water to be treated in the fluidized bed to be within a range of 8 to 10, said method characterized in that a desired volume of the treated water is introduced into the water to be treated for circulatory use.

Further, the present invention provides a treating apparatus of a manganese containing water for crystalizing and removing a soluble manganese, comprising a fluidized bed reaction vessel with no support bed containing manganese sand therein as a fluidized bed material, an inlet port provided on a bottom portion of said reaction vessel for introducing a water to be treated containing carbonic acid ions, an outlet port provided on an upper portion of said reaction vessel for discharging the treated water, and an injection port provided on the bottom portion of the reaction vessel near to the inlet port of the water to be treated and/or in the fluidized bed to adjust a pH value of the water to be treated in the fluidized bed to be within a range of 8 to 10, said apparatus characterized by further comprising a circulation path connecting said outlet port of the treated water and the inlet port of the water to be treated for circulating a desired quantity of said treated water.

As for the circulation of the treated water in the treating described above, it is preferable that a sedimentation tank is provided on a middle of the circulation path to use a part of supernatant liquid therein.

DETAILED DESCRIPTION OF THE PREFERRED EMBODIMENTS

According to the present invention, since there is provided a plurality of fluidized bed reaction towers and the pH value of the water to be treated in the fluidized bed is controlled such that the pH value increases as a stage of the reaction tower proceeds among the plurality of reaction towers, a deposition of manganese hydroxide can be suppressed because a crystalizing reaction progresses gradually in respective towers even if the manganese concentration in the water to be treated rises, and also, because of its multistage system, an arbitrary quantity of alkaline materials can be injected into respective towers even in a large treating apparatus.

Then the present invention will be described in detail with reference to FIG. 1., which shows a schematic configuration of a treating apparatus according to a first embodiment of the present invention.

Figure 1:
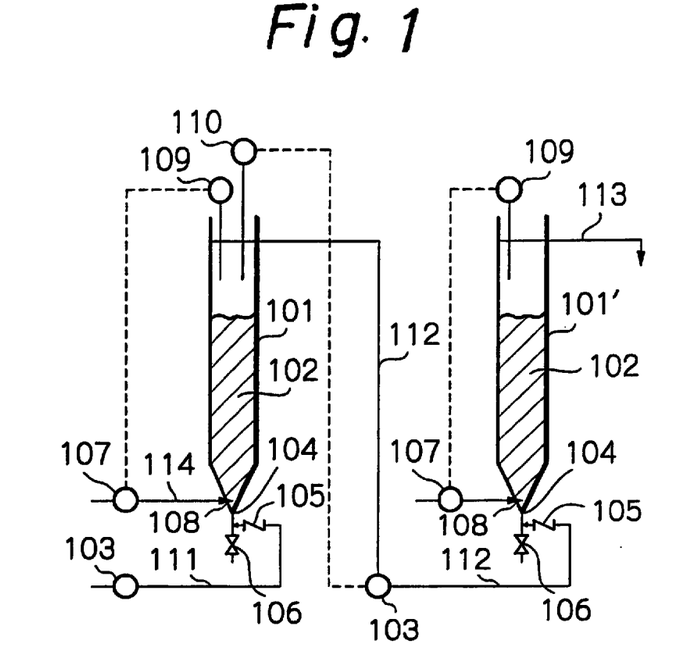
FIG. 1 shows a schematic configuration of a treating apparatus according to a first embodiment of the present invention.

An apparatus shown in FIG. 1 includes two fluidized bed reaction towers connected in series, each of which has no support bed and contains a bed material for deposition 102. This apparatus comprises at least two fluidized bed reaction towers 101 and 101' each having an alkaline material injection port 108 provided on a bottom portion of the fluidized bed near to an inlet port 104 for the water to be treated, two pH measuring devices 109, 109 each being provided for each reaction tower for measuring pH value of the water to be treated in the fluidized bed reaction tower, and two alkaline material injection pumps 107, 107 each being provided for each reaction tower whose discharge quantity is controlled by an output signal of the pH measuring device 109. Each reaction tower further comprises a pump 103 of the water to be treated for supplying the water to be treated, an inlet pipe 111 or 112 for the water to be treated, a check valve 105 for preventing a back flow of the bed material for deposition during shutdown period, a bed material drain pipe 106, an alkaline material injection pipe 114, a treated water pipe 113 for discharging the treated water, and a water level gauge 110 for measuring a water level of the treated water in the fluidized bed.

Then the present invention will be described for each constituent feature.

As for the manganese sand or the bed material 102 for crystalizing manganese carbonate, a granular material with a grain size of 0.1 to 5.0 mm may be used other than the manganese sand itself. Various materials such as sand, anthracite, activated carbon, carbide, plastics or the like may be used as the granular material. As for the granular material, such factors as material, grain size, shape, surface condition, packing density may be selected depending on the shape of the treating apparatus and the property of the water to be treated.

In order to stabilize the manganese crystalizing reaction earlier, the manganese sand, the above bed material with manganese attached thereon, or a raw material of metal manganese such as electrolytic manganese dioxide may be used as the bed material for crystalizing manganese carbonate. Manganese can be attached onto the surface of the granular material by, for example, spraying an aqueous solution of potassium permanganate or that of supersaturated manganese carbonate on the granular material or by dipping the granular material thereinto. Alternatively, such method may be employed that, after the fluidized bed reaction tower 101, 101' being packed with the granular material, the aqueous solution containing manganese is made flow through it.

The fluidized bed reaction tower 101, 101' has preferably 0.5 to 2.0 m of packed bed height of the bed material 102 for deposition and is packed therewith to have the proper height depending on properties of the water to be treated, flow velocity of the water, and a target water quality of treatment.

The fluidized bed reaction tower 101, 101' of the present invention usually needs no cleaning operation. When an organic SS or something to contaminate the bed material 102 is included in the water to be treated being supplied through the inlet pipe 111, however, the cleaning operation may be applied.

Further, since the support bed is not provided on purpose, an abnormal fluidity of the bed material 102 due to a clogging of the support bed or the like can be avoided, and the bed material can be fluidized effectively and consequently the manganese crystalizing reaction can be performed effectively by optimizing an introducing direction of the water to be treated being supplied through the inlet pipe 111 and a structure of the bottom portion of the fluidized bed reaction tower 101, 101'.

In addition, when the reaction speed of deposition of manganese carbonate drops, the thickened bed material 102 in the lower portion of the fluidized bed reaction tower is selectively drained through the bed material drain pipe 106 and then new bed material is added to the fluidized bed reaction tower from above thereof.

Sodium hydroxide, sodium carbonate or the like may be employed as the alkaline material for adjusting the pH value used in the present invention. The alkaline material injection port 108 is provided on the bottom portion of the fluidized bed reaction tower near to the inlet port 104 for the water to be treated.

The water to be treated in the present invention shall contain carbonic acid ions more than 1.1 mg, preferably more than 2.2 mg, for every manganese ions 1 mg, or carbonic acid ions shall be added thereto. Carbon acid ions may be added by adding sodium hydrogen-carbonate, sodium carbonate, carbon dioxide or the like. However, since normal irrigation/waste water includes a certain amount of carbonic acid ions enough to generate manganese carbonate, an existing amount thereof is not specified herein.

In the present invention, it is preferable that the pH value of the water to be treated in the fluidized beds is adjusted to be within the range of 8.0 to 10.0 and that the pH value increases as the stage of the reaction towers proceeds. For example, when two fluidized bed reaction towers are used, the pH value of the water to be treated in the first reaction tower is adjusted to be within the range of 8.0 to 9.5, and that in the second tower is adjusted to be within the range of 8.5 to 10.0. When the pH value is lower than 8.0, the crystalizing reaction does not occur, and when the pH value is more than 10.0, the crystalizing reaction occurs but it generates SS such as manganese hydroxide and an effect of the present invention cannot be utilized efficiently.

The flow velocity of the water to be treated into the reaction tower is preferably within the range of 200 to 2000 m/day in LV (Linear Velocity), but it is not limited to this range so far as the bed material is fluidized properly and the target water quality of treatment is accomplished.

According to the present invention, the soluble manganese is deposited and removed by the manganese sand fluidized bed in the fluidized bed reaction tower, and at the same time, the suspended manganese in the water to be treated is captured and removed by forming on the fluidized bed a sludge layer of the suspended solid (sludge) contained in the water to be treated.

The suspended solid in the water to be treated forms the sludge layer as below:
the manganese sand or the fluidized bed material
  grain size (diameter): 0.4 mm
  grain density: 2.6 g/ml
suspended solid in the water to be treated
  grain size (diameter): 0.01–0.1 mm
  grain density: 2.0 g/ml When the water to be treated is supplied to the fluidized bed reaction tower, the fluidized bed material therein is fluidized and the grains thereof repeat collisions one another. Accordingly, the surface of the grain of bed material is always kept clean to allow the crystalizing reaction continuously even if the suspended solid exists in the water to be treated.

Since the suspended solid in the water to be treated has, as described above, smaller grain size and grain density comparing with those of the fluidized bed material, it flows out of the fluidized bed reaction tower with the water to be treated and cannot stay therein.

Since the grains of the suspended solid in the water to be treated repeat collisions one another as those of the fluidized bed material, some of them are combined with each other to increase their grain sizes. The grains of the suspended solid having increased sizes of diameter can remain in the fluidized bed reaction tower and form suspended solid layer to increase the grain size more.

Increasing a section area of the reaction tower allows the suspended solid of smaller grain sizes to remain therein.

When passing through this layer, the suspended manganese is imbibed by the suspended solid composed of combined or size-increased grains together with other suspended solid in the water to be treated and remains in the reaction tower to be separated from the treated water.

Then the present invention will be described in detail with reference to FIG. 2., which shows a schematic configuration of a treating apparatus according to a second embodiment of the present invention.

Figure 2:
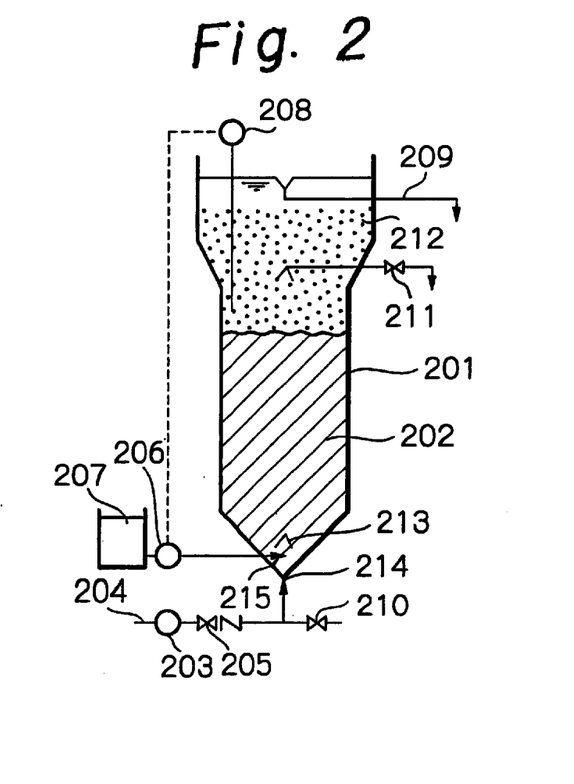
FIG. 2 shows a schematic configuration of a treating apparatus according to a second embodiment of the present invention.

The apparatus shown in FIG. 2 has no support bed but holds a fluidized bed 202 for crystalizing and a sludge layer 212 therein, and comprises at least a fluidized bed reaction tower 201 having an alkaline material injection port 215 provided on a bottom portion of the fluidized bed reaction tower 201 near to an inlet port 214 for the water to be treated, a pH measuring devices 208 disposed in the water to be treated in the fluidized bed reaction tower 201, and an alkaline material injection pump 206 connected to an alkaline material tank 207, whose discharge quantity is controlled by an output signal of the pH measuring device 208. This apparatus further comprises a pump 203 of the water to be treated for supplying the water to be treated, an inlet pipe 204 for the water to be treated, a dispersion plate 213 for uniformly dispersing the water to be treated throughout the fluidized bed 202, a check valve 205 for preventing a back flow of the bed material for deposition during shutdown period, a bed material drain pipe 210, a sludge ejector pipe 211, and a treated water pipe 209 for discharging the treated water.

As for the manganese sand or the bed material for crystalizing manganese carbonate used in the present invention, a granular material with a grain size of 0.1 to 5.0 mm may be used other than the manganese sand itself. Various materials such as sand, anthracite, activated carbon, carbide, plastics or the like may be used as the granular material. As for the granular material, such factors as material, grain size, shape, surface condition, packing density may be selected depending on the shape of the treating apparatus and the property of the water to be treated.

In order to stabilize the manganese crystalizing reaction earlier, the manganese sand, the above bed material with manganese attached thereon, or a raw material of metal manganese such as electrolytic manganese dioxide may be used as the bed material for crystalizing manganese carbonate. Manganese can be attached onto the surface of the granular material by, for example, spraying an aqueous solution of potassium permanganate or that of supersaturated manganese carbonate on the granular material or by dipping the granular material thereinto. Alternatively, such method may be employed that, after the fluidized bed reaction tower 201 being packed with the granular material, the aqueous solution containing manganese is made flow through it.

The fluidized bed reaction tower 201 has preferably 0.5 to 2.0 m of packed bed height of the bed material for deposition and is packed therewith to have the proper height depending on properties of the water to be treated, flow velocity of the water, and a target water quality of treatment.

The fluidized bed reaction tower 201 of the present invention usually needs no cleaning operation. When an organic SS or something to contaminate the bed material is included in the water to be treated being supplied through the inlet pipe 204, however, the cleaning operation may be applied.

Further, since the support bed is not provided on purpose, an abnormal fluidity of the bed material 202 due to a clogging of the support bed or the like can be avoided, and the bed material can be fluidized effectively and consequently the manganese crystalizing reaction can be performed effectively by optimizing an introducing direction of the water to be treated and a structure of the bottom portion of the fluidized bed reaction tower.

In addition, when the reaction speed of deposition of manganese carbonate drops, the thickened bed material in the lower portion of the fluidized bed reaction tower is selectively drained through the bed material drain pipe 210 and then new bed material is added to the fluidized bed reaction tower from above thereof.

In the present invention, when the sludge layer 212 in the fluidized bed reaction tower gets thicker, the sludge is ejected through the sludge ejector pipe.

Sodium hydroxide, sodium carbonate or the like may be employed as the alkaline material for adjusting the pH value used in the present invention. The alkaline material injection port 215 is provided on the bottom portion of the fluidized bed reaction tower near to the inlet port 214 for the water to be treated.

The water to be treated being supplied through the inlet pipe 204 according to the present invention shall contain carbonic acid ions more than 1.1 mg, preferably more than 2.2 mg, for every manganese ions 1 mg, and when it is less than these value, carbonic acid ions shall be added thereto. Carbonic acid ions may be added by adding sodium hydrogen-carbonate, sodium carbonate, carbon dioxide or the like. However, since normal irrigation/waste water includes a certain amount of carbonic acid ions enough to generate manganese carbonate, an existing amount thereof is not specified herein.

It is preferable that the pH value of the water to be treated in the fluidized beds reaction tower is adjusted to be within the range of 8.0 to 10.0. When the pH value is lower than 8.0, the crystalizing reaction does not occur, and when the pH value is more than 10.0, the crystalizing reaction occurs but it generates SS such as manganese hydroxide and an effect of the present invention cannot be utilized efficiently.

The flow velocity of the water to be treated into the reaction tower is preferably within the range of 200 to 2000 m/day in LV, but it is not limited to this range so far as the bed material is fluidized properly and the target water quality of treatment is accomplished.

As for the size of the fluidized bed reaction tower of the present invention, a diameter in an upper portion thereof accommodating the sludge layer 212 shall be preferably 1.4 times or more as large as that of a lower portion accommodating the fluidized bed 202 for deposition.

According to another embodiment of the present invention, since the discharge quantity of the alkaline material injection pump is controlled based on the output of the pH measuring device disposed in the water to be treated in the fluidized bed and an arbitrary quantity of treated water is circulated, it is possible to cope with the variation in the pH value of the water to be treated, and the crystalizing speed of manganese can be controlled also in response to a rise of the manganese concentration in the water to be treated, by a dilution effect of the circulated water to suppress the deposition of manganese hydroxide.

Then the present invention will be described in detail with reference to FIGS. 3 and 4, each of which shows respectively a schematic configuration of a treating apparatus according to a third or a fourth embodiment of the present invention.

Figure 3:
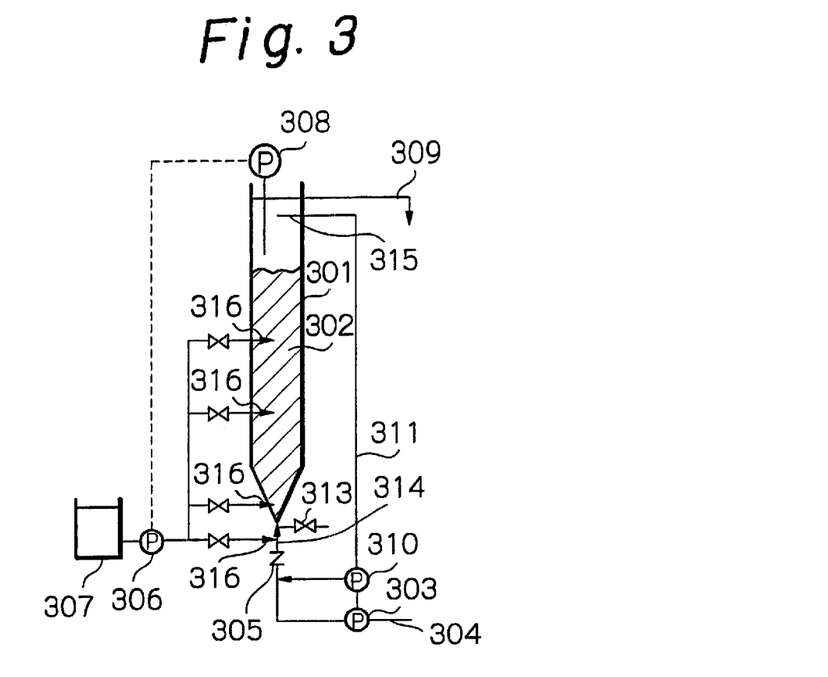
FIG. 3 shows a schematic configuration of a treating apparatus according to a third embodiment of the present invention.

The apparatus shown in FIG. 3 has no support bed but holds a fluidized bed material 302 or the manganese sand, and comprises at least a fluidized bed reaction vessel 301 having a plurality of alkaline material injection ports 316 disposed in a vicinity of an inlet port 314 and along the vertical line above it, a pH measuring devices 308 disposed in the water to be treated in the fluidized bed reaction vessel, and an alkaline material injection pump 306 whose discharge quantity is controlled by an output signal of the pH measuring device 308. This apparatus further comprises properly a raw water pump 303 for supplying the water to be treated (raw water), a raw water inlet pipe 304, a check valve 305 for preventing a back flow of the bed material for deposition during shutdown period, an alkaline material tank 307 for supplying the alkaline material, a treated water pipe 309 for discharging the treated water, a circulation pump 310 for circulating a part of the treated water, a treated water circulation pipe 311, and a bed material drain pipe 313. In addition, the apparatus may further comprise a control mechanism for controlling a total volume of the discharge quantities of the raw water pump 303 and the circulation pump 310 so as to be constant.

Figure 4:
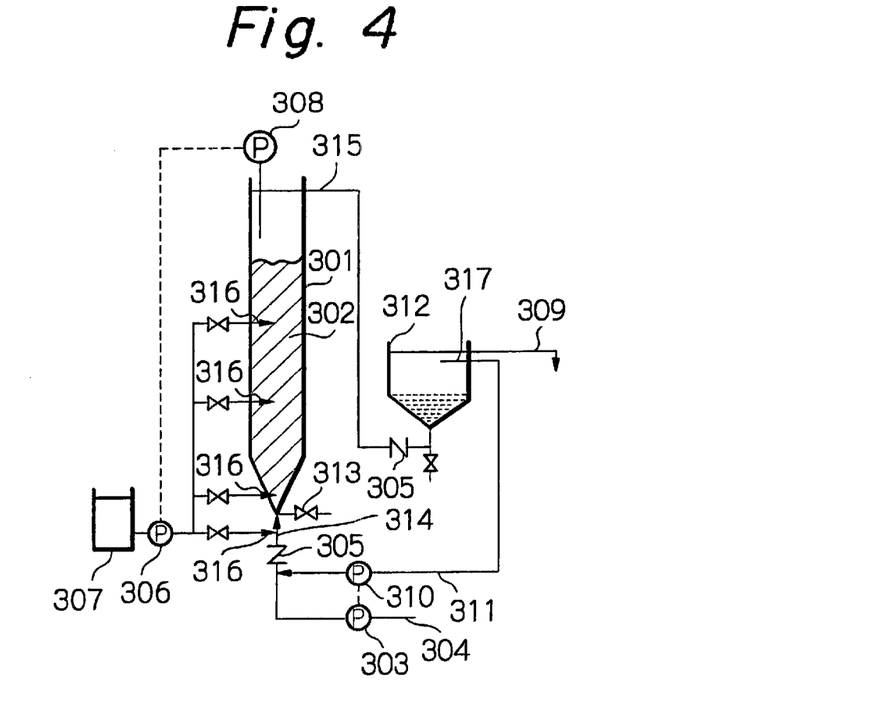
FIG. 4 shows a schematic configuration of a treating apparatus according to a fourth embodiment of the present invention.

The apparatus shown in FIG. 4 comprises, adding to the components of the apparatus shown in FIG. 3, a sedimentation tank 312 disposed in the middle of the circulation pipe of the treated water. The outflow water from the fluidized bed reaction vessel flows into the sedimentation tank through a lower pipe and a supernatant liquid flows out through an upper pipe (treated water pipe 309) as the treated water. The suspended solid contained in the outflow water from the fluidized bed reaction vessel is deposited and separated in the sedimentation tank, and an arbitrary quantity of the supernatant is circulated into the fluidized bed reactor vessel.

Then the present invention will be described for each constituent feature.

As for the manganese sand or the bed material for crystalizing manganese carbonate used in the present invention, a granular material with a grain size of 0.1 to 5.0 mm may be used other than the manganese sand itself. Various materials such as sand, anthracite, activated carbon, carbide, plastics or the like may be used as the granular material. As for the granular material, such factors as material, grain size, shape, surface condition, packing density may be selected depending on the shape of the treating apparatus and the property of the water to be treated.

In order to stabilize the manganese crystalizing reaction earlier, the manganese sand, the above bed material with manganese attached thereon, or a raw material of metal manganese such as electrolytic manganese dioxide may be used as the bed material for crystalizing manganese carbonate. Manganese can be attached onto the surface of the granular material by, for example, spraying an aqueous solution of potassium permanganate or that of supersaturated manganese carbonate on the granular material or by dipping the granular material thereinto. Alternatively, such method may be employed that, after the fluidized bed reaction vessel 301 being packed with the granular material, the aqueous solution containing manganese is made flow through it.

The fluidized bed reaction vessel 301 has preferably 1 to 3 m of packed bed height of the bed material for deposition and is packed therewith to have the proper height depending on properties of the water to be treated, flow velocity of the water, and a target water quality of treatment.

The fluidized bed reaction vessels shown in FIGS. 3 and 4 used in the present invention usually need no cleaning operation. When an organic SS or something to contaminate the bed material is included in the water to be treated, however, the cleaning operation may be applied.

Further, since the support bed is not provided on purpose, an abnormal fluidity of the bed material due to a clogging of the support bed or the like can be avoided, and the bed material can be fluidized effectively and consequently the manganese crystalizing reaction can be performed effectively by optimizing an introducing direction of the water to be treated and a structure of the bottom portion of the fluidized bed reaction vessel.

In addition, when the reaction speed of deposition of manganese carbonate drops, the thickened bed material in the lower portion of the fluidized bed reaction vessel is selectively drained through the bed material drain pipe and then new bed material is added to the fluidized bed reaction vessel from above thereof.

Sodium hydroxide, sodium carbonate or the like may be employed as the alkaline material for adjusting the pH value used in the present invention.

A plurality of alkaline material injection ports is provided on the bottom portion of the fluidized bed reaction vessel near to the inlet port for the water to be treated and in other portions of the fluidized bed. As for the vertical positions of the alkaline material injection ports, it is preferable that one of them is disposed on the bottom portion of the fluidized bed near to the raw water inlet pipe and one or more of them is(are) disposed on other portion(s) placing 0.5 m distance therebetween. When the alkaline material injection port is disposed on the fluidized bed reaction vessel near to the inlet port of the water to be treated, it is preferable that the position thereof is selected so that the water to be treated comes in contact with the bed material of manganese carbonate within two minutes. As for the horizontal position of the injection ports, it is preferable that the distances between a reaction vessel wall and each injection port and between respective injection ports are less than 100 mm. When only one alkaline material injection port is arranged on the fluidized bed reaction vessel, it is preferable that either of the bottom portion of the reaction vessel or the portion near to the inlet port of the water to be treated on the bottom portion of the reaction vessel is selected.

The water to be treated according to the present invention shall contain carbonic acid ions more than 1.1 mg, preferably more than 2.2 mg, for every manganese ions 1 mg, and when it is less than this value, carbonic acid ions shall be added thereto. Carbon acid ions may be added by adding sodium hydrogen-carbonate, sodium carbonate, carbon dioxide or the like. However, since normal irrigation/waste water includes a certain amount of carbonic acid ions enough to generate manganese carbonate, an existing amount thereof is not specified herein.

The flow velocity of the water to be treated into the reaction vessel is preferably within the range of 200 to 2000 m/day in LV, but it is not limited to this range so far as the bed material is fluidized properly and the target water quality of treatment is accomplished.

In the treating method of the present invention, it is preferable that the pH value of the water to be treated in the fluidized beds reaction vessel is adjusted to be within the range of 8.0 to 10.0. When the pH value is lower than 8.0, the crystalizing reaction does not occur, and when the pH value is more than 10.0, the crystalizing reaction occurs but it generates SS such as manganese hydroxide and an effect of the present invention cannot be utilized efficiently.

As for the injection quantity of the alkaline material, 50 to 80 percents of the whole quantity thereof shall be injected into a range between the injection port in the bottom of the reaction vessel and that in a half packed bed height of the bed material, and remaining 20 to 50 percents shall be injected into the injection ports in a range higher than the half packed bed height. The whole injection quantity of the alkaline material may be adjusted by an automatic control such as PID control based on a measured pH value of the water to be treated in the fluidized bed reaction vessel.

Since a crystalizing reaction speed in the lower part of the reaction vessel decreases as time goes by, the reaction speed may be recovered or maintained by stopping the injection of the alkaline material into the bottom of the reaction vessel, and by injecting 50 to 80 percents of the whole quantity into a range between the injection port next to that in the bottom of the reaction vessel and that in a half packed bed height of the bed material.

Then the treated water circulation, which is one of the features of the present invention, will be described. In the present invention, when the flow rate of the raw water is low, a deficient quantity is compensated by the treated water circulation to keep the flow velocity in the fluidized bed. A control mechanism may be employed in order to keep the total flow rate of the raw water pump and the circulation pump constant.

When a pH of the raw water varies over wide range, the pH value in the fluidized bed can be stabilized by circulating an arbitrary quantity of treated water so as to make it serve as a buffer material.

When the concentration of Mn in the raw water rises, the manganese concentration may be lowered to suppress the generation of manganese hydroxide by circulating an arbitrary quantity of treated water to dilute the raw water.

The circulation quantity of the treated water depends on the variation range of pH value and the manganese concentration in the raw water, and is preferably 0.5 to 5 times as much as the flow rate of the raw water.

According to the present invention, when the raw water contains much suspended solid and there is much circulation quantity, the sedimentation tank may be provided to prevent the suspended solid in the water from staying in the fluidized bed for long time. The flow velocity in the sedimentation tank is preferably slower than that in the fluidized bed.

Then the present invention will be described in more detail based on the embodiments as below.

EMBODIMENT NO. 1

The water to be treated shown in Table No. 1 is treated by the use of the two tower type treating apparatus shown in FIG. 1.

The manganese sand with an average grain size of 0.4 mm is employed as the bed material for crystalizing manganese carbonate. The fluidized bed reaction tower of 100 mm diameter is packed with 16 liters of this bed material, and the water is applied through it at the flow velocity of LV 600 m/d in the fluidized bed reaction tower.

The apparatus of FIG. 1 used in the present treatment employs two fluidized bed reaction towers described above so as to be connected in series, and the pH value of the water to be treated in the first reaction tower is adjusted to be 9.0 and that in the second tower to be 9.5.

While, as a control, one fluidized bed reaction tower of the conventional apparatus shown in FIG. 5 is employed and the pH value of the water to be treated is adjusted to be 9.5, and the treating operation is conducted in the same manner as of the present invention. The results are shown in Table 1.

TABLE 1

| Water flow period (hrs.) | 50 | 60 | 90 | 120 | 150 |
|---|---|---|---|---|---|
| Water to be treated | | | | | |
| pH (-) | 7.7 | 7.6 | 8.0 | 7.5 | 7.9 |
| T-Mn (mg/l) | 35.4 | 33.0 | 47.8 | 45.2 | 35.4 |
| S-Mn (mg/l) | 31.7 | 32.1 | 47.4 | 38.7 | 34.9 |
| Present invention, FIG.1 (Water in the 1st tower) | | | | | |
| pH (-) | 8.8 | 9.0 | 9.1 | 9.0 | 8.9 |
| T-Mn (mg/l) | 12.4 | 10.5 | 11.2 | 19.7 | 10.4 |
| S-Mn (mg/l) | 8.6 | 9.4 | 10.7 | 9.8 | 9.7 |
| Increase of T-Mn (mg/l) | 0.1 | 0.2 | 0.1 | 0.4 | 0.2 |
| (Water in the 2nd tower) | | | | | |
| pH (-) | 9.5 | 9.6 | 9.5 | 9.6 | 9.4 |
| T-Mn (mg/l) | 4.2 | 1.3 | 0.9 | 7.3 | 1.1 |
| S-Mn (mg/l) | 0.3 | 0.1 | 0.3 | 0.2 | 0.2 |
| Increase of T-Mn (mg/l) | 0.2 | 0.3 | 0.2 | 0.6 | 0.4 |
| Conventional one, FIG.5 | | | | | |

TABLE 1-continued

| Water flow period (hrs.) | 50 | 60 | 90 | 120 | 150 |
|---|---|---|---|---|---|
| (Water) | | | | | |
| pH (-) | 9.5 | 9.8 | 9.4 | 9.6 | 9.1 |
| T-Mn (mg/l) | 7.5 | 10.3 | 8.4 | 9.9 | 6.9 |
| S-Mn (mg/l) | 0.5 | 0.1 | 0.4 | 0.2 | 0.3 |
| Increase of T-Mn (mg/l) | 3.3 | 9.3 | 7.6 | 3.2 | 6.1 |

In the present invention, the pH value of the water to be treated is stable such as, the first tower: 8.8–9.1, the second tower: 9.4–9.6, and the increase of T-Mn from the raw water is slight such as, the first tower: 0.1–0.4 mg/l, the second tower: 0.2–0.6 mg/l.

While in the control or the conventional apparatus, the pH value of the water to be treated varies over wide range such as 9.1–9.8, and the increase of T-Mn from the raw water is large such as 3.2–9.3 mg/l.

EMBODIMENT NO. 2

The water to be treated of Table 2 is treated by the use of the treating apparatus shown in FIG. 2.

16 liters of manganese sand with an average grain size of 0.4 mm is used as the bed material for crystalizing manganese carbonate.

As the fluidized bed reaction tower is used a column having a portion with 100 mm of diameter for accommodating the fluidized bed of the bed material for deposition and another portion with 140 mm of diameter for accommodating the sludge layer, and the pH value of the water to be treated is adjusted to be 9.5.

While, as a control, the conventional apparatus shown in FIG. 5 is used and the same water to be treated is treated. As the reaction tower, a column with 100 mm of diameter is employed and the pH value of the water to be treated is adjusted to be 9.5. The results are shown in Table 2.

TABLE 2

| Water flow period (hrs.) | 50 | 60 | 90 | 120 | 150 |
|---|---|---|---|---|---|
| Water to be treated | | | | | |
| pH (-) | 7.7 | 7.6 | 8.0 | 7.5 | 7.9 |
| T-Mn (mg/l) | 35.4 | 33.0 | 47.8 | 45.2 | 35.4 |
| Suspended solid Mn (mg/l) | 13.7 | 10.9 | 10.4 | 16.5 | 10.5 |
| Soluble Mn (mg/l) | 21.7 | 22.1 | 37.4 | 28.7 | 24.9 |
| Present invention | | | | | |
| pH (-) | 9.5 | 9.7 | 9.5 | 9.6 | 9.4 |
| T-Mn (mg/l) | 6.2 | 3.8 | 0.9 | 1.2 | 0.7 |
| Suspended solid Mn (mg/l) | 5.9 | 3.7 | 0.6 | 1.0 | 0.5 |
| Soluble Mn (mg/l) | 0.3 | 0.1 | 0.3 | 0.2 | 0.2 |
| Conventional one | | | | | |
| pH (-) | 9.5 | 9.8 | 9.4 | 9.6 | 9.1 |
| T-Mn (mg/l) | 16.3 | 13.2 | 14.2 | 19.2 | 12.5 |
| Suspended solid Mn (mg/l) | 15.8 | 13.1 | 13.8 | 19.0 | 12.2 |
| Soluble Mn (mg/l) | 0.5 | 0.1 | 0.4 | 0.2 | 0.3 |

In the present invention, the pH value of the water to be treated is 9.4 to 9.7, and the suspended manganese therein decreases gradually as time goes, and it reaches 0.5 mg/l after 150 hours.

While in the conventional one, the pH value of the water to be treated is 9.1 to 9.8, and the suspended manganese therein increases up to 12.2–19.0 mg/l, which is more than that in the water to be treated.

EMBODIMENT NO. 3

The raw water shown in Table 3 is treated by the apparatus of the present invention shown in FIG. 3 and the conventional apparatus shown in FIG. 5 as a control.

The manganese sand with an average grain size of 0.4 mm is employed as the bed material for crystalizing manganese carbonate.

The fluidized bed reaction tower of 100 mm diameter is packed with 16 liters of this bed material, and the water is applied through it at the flow velocity of LV 600 m/d in the fluidized bed. As to the apparatus of the present invention, both of the raw water and the circulation water are made flow through it by a quantity ratio of 1:1, while in the conventional apparatus, only the raw water is made flow through it. The alkaline material is injected to each apparatus from the lower portion of the fluidized bed thereof so that the pH value of the water in the fluidized bed may be adjusted to be 9.5. The results are shown in Table 3.

TABLE 3

| Water flow period (hrs.) | 50 | 60 | 90 | 120 | 150 |
|---|---|---|---|---|---|
| Raw water | | | | | |
| pH (−) | 7.7 | 7.6 | 8.0 | 7.5 | 7.9 |
| T-Mn (mg/l) | 35.4 | 33.0 | 47.8 | 45.2 | 35.4 |
| S-Mn (mg/l) | 31.7 | 32.1 | 47.4 | 38.7 | 34.9 |
| Difference between T-Mn and S-Mn (mg/l) | 3.7 | 0.9 | 0.4 | 6.5 | 0.5 |
| Present invention | | | | | |
| pH (−) | 9.5 | 9.6 | 9.5 | 9.6 | 9.4 |
| T-Mn (mg/l) | 4.2 | 1.3 | 0.9 | 7.3 | 1.1 |
| S-Mn (mg/l) | 0.3 | 0.1 | 0.3 | 0.2 | 0.2 |
| Difference between T-Mn and S-Mn (mg/l) | 3.9 | 1.2 | 0.6 | 7.1 | 0.9 |
| Increase of T-Mn (mg/l) | 0.2 | 0.3 | 0.2 | 0.6 | 0.4 |
| Conventional one | | | | | |
| pH (−) | 9.5 | 9.8 | 9.4 | 9.6 | 9.1 |
| T-Mn (mg/l) | 7.5 | 10.3 | 8.4 | 9.9 | 6.9 |
| S-Mn (mg/l) | 0.5 | 0.1 | 0.4 | 0.2 | 0.3 |
| Difference between T-Mn and S-Mn (mg/l) | 7.0 | 10.2 | 8.0 | 9.7 | 6.6 |
| Increase of T-Mn (mg/l) | 3.3 | 9.3 | 7.6 | 3.2 | 6.1 |

The treatment result by the apparatus of the present invention shows that the pH value of the water to be treated is 9.4–9.6, and the increase of T-Mn is 0.2–0.6 mg/l, while that by the conventional apparatus shows that the pH value of the water to be treated is 9.1–9.8, and the increase of T-Mn is 3.2–9.3 mg/l. This shows that the apparatus of the present invention makes the pH value stable and accomplishes the manganese removal with small increase of T-Mn.

EFFECT OF THE INVENTION

According to the present invention, the deposition of manganese hydroxide can be suppressed since a plurality of fluidized bed reaction towers is provided and the pH value of the water to be treated in the fluidized bed is controlled such that the pH value increases as a stage of the reaction tower proceeds from a former stage to a latter stage so that the crystalizing reaction proceed gradually in respective towers even if the manganese concentration in the water to be treated rises, and an arbitrary quantity of alkaline material is allowed to be injected into respective towers effectively even if the apparatus is made larger since the present invention employs multistage system. In addition, the present invention makes it possible to remove the soluble manganese without generating much T-Mn.

According to the present invention, the soluble manganese can be deposited and removed by the manganese sand fluidized bed, and at the same time, the suspended manganese can be also removed by making the suspended solid contained in the water to be treated form the sludge layer on said fluidized bed to impart the capacities for capturing the suspended solid in the water to said sludge layer. The present invention allows manganese to be treated whether it being suspended solid or soluble one.

The present invention makes it possible to remove manganese while suppressing the generation of manganese hydroxide even if the pH value in the water to be treated varies or the manganese concentration therein rises.

What is claimed is:

1. A treating method for treating a water to be treated containing a soluble manganese and carbonic acid ions by removing manganese therefrom, said method comprising the steps of:

passing the water to be treated as an upward flow through a fluidized bed reaction tower having no support bed but a fluidized bed of which fluidizing medium is manganese sand;

adjusting a pH value of the water to be treated in said fluidized bed so that the pH value of the water to be treated is within a proper range to crystalize manganese carbonate of the water to be treated;

forming a sludge layer of suspended solid above said fluidized bed so that suspended solid including suspended manganese passed through the fluidized bed is captured by the sludge layer of suspended solid; and removing the sludge layer of suspended solid having captured the suspended solid;

whereby a suspended manganese is removed together with the soluble manganese in the water to be treated.

2. A treating method according to claim 1, further comprising a step of introducing a desired quantity of treated water into the water to be treated.

3. A treating method according to claim 2, wherein said step of introducing the treated water includes introducing a supernatant liquid of the treated water, from which suspended solid is removed, into the water to be treated.

4. A treating method according to claim 1, wherein said step of adjusting a pH value of the water to be treated includes a step of injecting an alkaline material adjacent to an inlet port of the water to be treated provided at a bottom portion of said reaction tower or in said fluidized bed.

* * * * *

UNITED STATES PATENT AND TRADEMARK OFFICE
CERTIFICATE OF CORRECTION

PATENT NO.     : 6,495,050 B1                                            Page 1 of 1
DATED          : December 17, 2002
INVENTOR(S)    : Nomura et al.

It is certified that error appears in the above-identified patent and that said Letters Patent is hereby corrected as shown below:

<u>Title page,</u>
Item [30], Foreign Application Priority Data, should read:

-- [30]      Foreign Application Priority Data
     Mar. 30, 1998   (JP) .............................. 10-99861 --

Signed and Sealed this

Thirteenth Day of May, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,495,050 B1
DATED         : December 17, 2002
INVENTOR(S)   : Nomura et al.

Page 1 of 1

It is certified that error appears in the above-identified patent and that said Letters Patent is hereby corrected as shown below:

<u>Title page,</u>
Items [22], [86] and [87], should read:

--
| | | |
|---|---|---|
| [22] | PCT Filed: | Mar. 30, 1999 |
| [86] | PCT No.: | PCT/JP99/01608 |
| | § 371 (c)(1), | |
| | (2), (4) Date: | Dec. 18, 2000 |
| [87] | PCT Pub. No.: | WO99/50190 |
| | PCT Pub. Date: | Oct. 7, 1999 -- |

Signed and Sealed this

Twenty-second Day of July, 2003

JAMES E. ROGAN
*Director of the United States Patent and Trademark Office*